US011203357B2

(12) United States Patent
Kumai et al.

(10) Patent No.: US 11,203,357 B2
(45) Date of Patent: Dec. 21, 2021

(54) VEHICLE AUTOMATED DRIVING SYSTEM

(71) Applicant: TOYOTA JIDOSHA KABUSHIKI KAISHA, Toyota (JP)

(72) Inventors: Yuichi Kumai, Gotenba (JP); Naoki Matsushita, Yamato (JP); Masaki Matsunaga, Odawara (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 573 days.

(21) Appl. No.: 15/495,037

(22) Filed: Apr. 24, 2017

(65) Prior Publication Data

US 2017/0313324 A1 Nov. 2, 2017

(30) Foreign Application Priority Data

Apr. 27, 2016 (JP) .............................. JP2016-089116

(51) Int. Cl.
*B60W 50/10* (2012.01)
*B60W 40/02* (2006.01)
(Continued)

(52) U.S. Cl.
CPC ............ *B60W 50/10* (2013.01); *B60W 40/02* (2013.01); *B60W 40/08* (2013.01); *B60W 50/082* (2013.01); *B60W 50/14* (2013.01); *B60W 2050/0089* (2013.01); *B60W 2050/146* (2013.01); *B60W 2420/403* (2013.01);
(Continued)

(58) Field of Classification Search
CPC ........... B60W 50/10; B60W 2550/402; B60W 2550/12; B60W 2540/28; B60W 2520/14; B60W 2520/105; B60W 2520/10; B60W 2420/52; B60W 2420/403; B60W 2050/146; B60W 2050/0089;
(Continued)

(56) References Cited

U.S. PATENT DOCUMENTS 8,670,891 B1 * 3/2014 Szybalski ............. B60W 10/30
701/23
2014/0309804 A1 * 10/2014 Ricci .................... A61B 5/7405
701/1
(Continued)

FOREIGN PATENT DOCUMENTS

JP 09-86223 A 3/1997
JP 11-102157 A 4/1999

*Primary Examiner* — Mathew Franklin Gordon
(74) *Attorney, Agent, or Firm* — Sughrue Mion, PLLC

(57) ABSTRACT

A vehicle automated driving system 100 comprises a surrounding environment information acquiring device 10, a vehicle information acquiring device 20, a driver information acquiring device 30, a package selecting part 90, a package proposing part 91, an automated driving executing part 92, and a rejection count detecting part 93. The package selecting part determines the driving assistance package based on at least one of the surrounding environment information, the vehicle information, and the driver information, selects the determined driving assistance package if the rejection count of the determined driving assistance package is less than a predetermined threshold value, and selects a driving assistance package different from the determined driving assistance package if the rejection count of the determined driving assistance package is the threshold value or more.

12 Claims, 17 Drawing Sheets

(51) Int. Cl.
*B60W 40/08* (2012.01)
*B60W 50/08* (2020.01)
*B60W 50/14* (2020.01)
*B60W 50/00* (2006.01)

(52) U.S. Cl.
CPC ..... *B60W 2420/52* (2013.01); *B60W 2520/10* (2013.01); *B60W 2520/105* (2013.01); *B60W 2520/14* (2013.01); *B60W 2540/043* (2020.02); *B60W 2555/20* (2020.02); *B60W 2556/50* (2020.02)

(58) Field of Classification Search
CPC .... B60W 50/14; B60W 50/082; B60W 40/08; B60W 40/02
See application file for complete search history.

(56) References Cited

U.S. PATENT DOCUMENTS

| | | |
|---|---|---|
| 2015/0166062 A1 | 6/2015 | Johnson et al. |
| 2016/0068158 A1* | 3/2016 | Elwart .................. B60W 10/00 701/41 |
| 2016/0347327 A1* | 12/2016 | Kondo .................. B60W 50/14 |
| 2018/0079359 A1 | 3/2018 | Park et al. |
| 2018/0178800 A1 | 6/2018 | Ishii et al. |
| 2018/0194365 A1 | 7/2018 | Bae et al. |
| 2018/0208211 A1* | 7/2018 | Chiba .................. B60W 50/082 |
| 2019/0064827 A1 | 2/2019 | Goto et al. |

* cited by examiner

FIG. 4

| | DRIVING ASSISTANCE OPERATIONS |
|---|---|
| RUNNING ASSIST FUNCTIONS | VEHICLE DISTANCE CONTROL |
| | LANE TRACKING CONTROL |
| | AUTO LANE CHANGE |
| | AUTO PASSING |
| | AUTO BRANCHING |
| | AUTO MERGING |
| VISION ASSIST FUNCTIONS | LANE DEPARTURE WARNING |
| | BLIND SPOT MONITORING |
| | VEHICLE PROXIMITY ALARM |
| | PEDESTRIAN PROXIMITY ALARM |
| | HI BEAM AUTO CHANGE |
| | HEADLIGHT AUTO DIRECTION CONTROL |
| | HEADLIGHT/FOGLIGHT AUTO TURN ON |
| | WIPER AUTO OPERATION |
| | DEFROSTER AUTO OPERATION |
| | NIGHT VIEW AUTO OPERATION |
| | PROVISION OF SURROUNDING SITUATION |
| CONGESTION ASSIST FUNCTIONS | AUTO START FROM STOP AT CONGESTION |
| | HAZARD LIGHT TEMPORARY TURN ON CONTROL |
| | AUTO SWITCH OF CIRCULATION OF INSIDE/OUTSIDE AIR OF AC |
| | CHANGE OF SEAT POSITION |
| | PROVISION OF CONGESTION INFORMATION |
| | DISPLAY OF MOVING IMAGE |
| | AUTO ADJUSTMENT OF AUDIO VOLUME |
| | JERK REDUCING RUNNING CONTROL |

FIG. 5

| | | CLEAR | RAIN | HEAVY RAIN | SNOW | HEAVY SNOW | FOG | DENSE FOG | WINDY | STRONG WIND |
|---|---|---|---|---|---|---|---|---|---|---|
| | DRIVING ASSISTANCE OPERATIONS | | | | | | | | | |
| RUNNING ASSIST FUNCTIONS | VEHICLE DISTANCE CONTROL | O | O | O | O | O | O | O | O | O |
| | LANE TRACKING CONTROL | O | O | x | O | x | O | x | O | O |
| | AUTO LANE CHANGE | O | x | x | x | x | x | x | x | x |
| | AUTO PASSING | O | x | x | x | x | x | x | x | x |
| | AUTO BRANCHING | O | x | x | x | x | x | x | O | x |
| | AUTO MERGING | O | x | x | x | x | x | x | O | x |
| VISION ASSIST FUNCTIONS | LANE DEPARTURE WARNING | x | O | x | O | x | O | x | O | O |
| | BLIND SPOT MONITORING | x | O | x | O | x | O | x | O | O |
| | VEHICLE PROXIMITY ALARM | x | O | x | x | x | O | x | O | O |
| | PEDESTRIAN PROXIMITY ALARM | x | x | O | x | x | x | x | x | x |
| | HI BEAM AUTO CHANGE | x | O | O | O | x | x | x | x | x |
| | HEADLIGHT AUTO DIRECTION CONTROL | x | x | x | O | x | x | x | x | x |
| | HEADLIGHT/FOGLIGHT AUTO TURN ON | x | x | x | x | x | O | O | x | x |
| | WIPER AUTO OPERATION | x | x | x | x | O | x | x | x | x |
| | DEFROSTER AUTO OPERATION | x | x | x | O | O | x | x | x | x |
| | NIGHT VIEW AUTO OPERATION | x | x | x | x | x | x | x | x | x |
| | PROVISION OF SURROUNDING SITUATION | x | x | x | x | x | x | x | x | x |
| CONGESTION ASSIST FUNCTIONS | AUTO START FROM STOP AT CONGESTION | x | x | x | x | x | x | x | x | x |
| | HAZARD LIGHT TEMPORARY TURN ON CONTROL | x | x | x | x | x | x | x | x | x |
| | AUTO SWITCH OF CIRCULATION OF INSIDE/OUTSIDE AIR OF AC | x | x | x | x | x | x | x | x | x |
| | CHANGE OF SEAT POSITION | x | x | x | x | x | x | x | x | x |
| | PROVISION OF CONGESTION INFORMATION | x | x | x | x | x | x | x | x | x |
| | DISPLAY OF MOVING IMAGE | x | x | x | x | x | x | x | x | x |
| | AUTO ADJUSTMENT OF AUDIO VOLUME | x | x | x | x | x | x | x | x | x |
| | JERK REDUCING RUNNING CONTROL | x | x | x | x | x | x | x | x | x |

FIG 6

| | DRIVING ASSISTANCE OPERATIONS | DAY | NIGHT |
|---|---|---|---|
| RUNNING ASSIST FUNCTIONS | VEHICLE DISTANCE CONTROL | ○ | ○ |
| | LANE TRACKING CONTROL | ○ | ○ |
| | AUTO LANE CHANGE | ○ | ○ |
| | AUTO PASSING | ○ | ○ |
| | AUTO BRANCHING | ○ | ○ |
| | AUTO MERGING | ○ | ○ |
| VISION ASSIST FUNCTIONS | LANE DEPARTURE WARNING | × | × |
| | BLIND SPOT MONITORING | × | × |
| | VEHICLE PROXIMITY ALARM | × | × |
| | PEDESTRIAN PROXIMITY ALARM | × | ○ |
| | HI BEAM AUTO CHANGE | × | ○ |
| | HEADLIGHT AUTO DIRECTION CONTROL | × | × |
| | HEADLIGHT/FOGLIGHT AUTO TURN ON | × | × |
| | WIPER AUTO OPERATION | × | ○ |
| | DEFROSTER AUTO OPERATION | × | × |
| | NIGHT VIEW AUTO OPERATION | × | × |
| | PROVISION OF SURROUNDING SITUATION | × | × |
| CONGESTION ASSIST FUNCTIONS | AUTO START FROM STOP AT CONGESTION | × | × |
| | HAZARD LIGHT TEMPORARY TURN ON CONTROL | × | × |
| | AUTO SWITCH OF CIRCULATION OF INSIDE/OUTSIDE AIR OF AC | × | × |
| | CHANGE OF SEAT POSITION | × | × |
| | PROVISION OF CONGESTION INFORMATION | × | × |
| | DISPLAY OF MOVING IMAGE | × | × |
| | AUTO ADJUSTMENT OF AUDIO VOLUME | × | × |
| | JERK REDUCING RUNNING CONTROL | × | × |

FIG 7

| | DRIVING ASSISTANCE OPERATIONS | GENERAL ROADS | TRUNK ROADS | INTER-CITY HIGHWAYS | CITY HIGHWAYS |
|---|---|---|---|---|---|
| RUNNING ASSIST FUNCTIONS | VEHICLE DISTANCE CONTROL | ○ | ○ | ○ | ○ |
| | LANE TRACKING CONTROL | ○ | ○ | × | ○ |
| | AUTO LANE CHANGE | ○ | × | × | × |
| | AUTO PASSING | ○ | × | × | × |
| | AUTO BRANCHING | ○ | × | × | ○ |
| | AUTO MERGING | ○ | × | × | × |
| | LANE DEPARTURE WARNING | ○ | ○ | × | ○ |
| | BLIND SPOT MONITORING | ○ | ○ | × | ○ |
| | VEHICLE PROXIMITY ALARM | ○ | ○ | × | ○ |
| | PEDESTRIAN PROXIMITY ALARM | ○ | × | × | × |
| | HI BEAM AUTO CHANGE | ○ | × | ○ | × |
| VISION ASSIST FUNCTIONS | HEADLIGHT AUTO DIRECTION CONTROL | ○ | ○ | ○ | × |
| | HEADLIGHT/FOGLIGHT AUTO TURN ON | ○ | ○ | ○ | ○ |
| | WIPER AUTO OPERATION | ○ | ○ | ○ | ○ |
| | DEFROSTER AUTO OPERATION | × | × | × | × |
| | NIGHT VIEW AUTO OPERATION | × | × | × | × |
| | PROVISION OF SURROUNDING SITUATION | × | × | × | × |
| CONGESTION ASSIST FUNCTIONS | AUTO START FROM STOP AT CONGESTION | × | × | × | × |
| | HAZARD LIGHT TEMPORARY TURN ON CONTROL | × | × | × | × |
| | AUTO SWITCH OF CIRCULATION OF INSIDE/OUTSIDE AIR OF AC | × | × | × | × |
| | CHANGE OF SEAT POSITION | × | × | × | × |
| | PROVISION OF CONGESTION INFORMATION | × | × | × | × |
| | DISPLAY OF MOVING IMAGE | × | × | × | × |
| | AUTO ADJUSTMENT OF AUDIO VOLUME | × | × | × | × |
| | JERK REDUCING RUNNING CONTROL | × | × | × | × |

FIG. 8

| | DRIVING ASSISTANCE OPERATIONS | CONGESTED | NOT CONGESTED |
|---|---|---|---|
| RUNNING ASSIST FUNCTIONS | VEHICLE DISTANCE CONTROL | ○ | ○ |
| | LANE TRACKING CONTROL | ○ | ○ |
| | AUTO LANE CHANGE | × | ○ |
| | AUTO PASSING | × | ○ |
| | AUTO BRANCHING | ○ | ○ |
| | AUTO MERGING | ○ | ○ |
| VISION ASSIST FUNCTIONS | LANE DEPARTURE WARNING | ○ | × |
| | BLIND SPOT MONITORING | ○ | × |
| | VEHICLE PROXIMITY ALARM | ○ | × |
| | PEDESTRIAN PROXIMITY ALARM | ○ | × |
| | HI BEAM AUTO CHANGE | ○ | × |
| | HEADLIGHT AUTO DIRECTION CONTROL | ○ | × |
| | HEADLIGHT/FOGLIGHT AUTO TURN ON | ○ | × |
| | WIPER AUTO OPERATION | ○ | × |
| | DEFROSTER AUTO OPERATION | ○ | × |
| | NIGHT VIEW AUTO OPERATION | ○ | × |
| | PROVISION OF SURROUNDING SITUATION | ○ | × |
| CONGESTION ASSIST FUNCTIONS | AUTO START FROM STOP AT CONGESTION | ○ | × |
| | HAZARD LIGHT TEMPORARY TURN ON CONTROL | ○ | × |
| | AUTO SWITCH OF CIRCULATION OF INSIDE/OUTSIDE AIR OF AC | ○ | × |
| | CHANGE OF SEAT POSITION | ○ | × |
| | PROVISION OF CONGESTION INFORMATION | ○ | × |
| | DISPLAY OF MOVING IMAGE | ○ | × |
| | AUTO ADJUSTMENT OF AUDIO VOLUME | ○ | × |
| | JERK REDUCING RUNNING CONTROL | ○ | × |

FIG. 9

| | DRIVING ASSISTANCE OPERATIONS | SLEEPY | TIRED | OVERWORKED | DISTRACTED | NORMAL |
|---|---|---|---|---|---|---|
| RUNNING ASSIST FUNCTIONS | VEHICLE DISTANCE CONTROL | ○ | ○ | ○ | ○ | ○ |
| | LANE TRACKING CONTROL | ○ | ○ | ○ | ○ | ○ |
| | AUTO LANE CHANGE | × | ○ | × | × | ○ |
| | AUTO PASSING | × | ○ | × | × | ○ |
| | AUTO BRANCHING | ○ | × | ○ | × | ○ |
| | AUTO MERGING | ○ | × | × | × | ○ |
| VISION ASSIST FUNCTIONS | LANE DEPARTURE WARNING | × | × | × | × | × |
| | BLIND SPOT MONITORING | × | × | × | × | × |
| | VEHICLE PROXIMITY ALARM | × | × | × | × | × |
| | PEDESTRIAN PROXIMITY ALARM | × | × | × | × | × |
| | HI BEAM AUTO CHANGE | × | × | × | × | × |
| | HEADLIGHT AUTO DIRECTION CONTROL | × | × | × | × | × |
| | HEADLIGHT/FOGLIGHT AUTO TURN ON | × | × | × | × | × |
| | WIPER AUTO OPERATION | × | × | × | × | × |
| | DEFROSTER AUTO OPERATION | × | × | × | × | × |
| | NIGHT VIEW AUTO OPERATION | × | × | × | × | × |
| | PROVISION OF SURROUNDING SITUATION | × | × | × | × | × |
| CONGESTION ASSIST FUNCTIONS | AUTO START FROM STOP AT CONGESTION | × | × | × | × | × |
| | HAZARD LIGHT TEMPORARY TURN ON CONTROL | × | × | × | × | × |
| | AUTO SWITCH OF CIRCULATION OF INSIDE/OUTSIDE AIR OF AC | × | × | × | × | × |
| | CHANGE OF SEAT POSITION | × | × | × | × | × |
| | PROVISION OF CONGESTION INFORMATION | × | × | × | × | × |
| | DISPLAY OF MOVING IMAGE | × | × | × | × | × |
| | AUTO ADJUSTMENT OF AUDIO VOLUME | × | × | × | × | × |
| | JERK REDUCING RUNNING CONTROL | × | × | × | × | × |

FIG. 10

| DRIVING ASSISTANCE OPERATIONS | | UNSTABLE | STABLE |
|---|---|---|---|
| RUNNING ASSIST FUNCTIONS | VEHICLE DISTANCE CONTROL | ○ | ○ |
| | LANE TRACKING CONTROL | ○ | ○ |
| | AUTO LANE CHANGE | × | ○ |
| | AUTO PASSING | × | ○ |
| | AUTO BRANCHING | × | ○ |
| | AUTO MERGING | × | ○ |
| VISION ASSIST FUNCTIONS | LANE DEPARTURE WARNING | × | × |
| | BLIND SPOT MONITORING | × | × |
| | VEHICLE PROXIMITY ALARM | × | × |
| | PEDESTRIAN PROXIMITY ALARM | × | × |
| | HI BEAM AUTO CHANGE | × | × |
| | HEADLIGHT AUTO DIRECTION CONTROL | × | × |
| | HEADLIGHT/FOGLIGHT AUTO TURN ON | × | × |
| | WIPER AUTO OPERATION | × | × |
| | DEFROSTER AUTO OPERATION | × | × |
| | NIGHT VIEW AUTO OPERATION | × | × |
| | PROVISION OF SURROUNDING SITUATION | × | × |
| CONGESTION ASSIST FUNCTIONS | AUTO START FROM STOP AT CONGESTION | × | × |
| | HAZARD LIGHT TEMPORARY TURN ON CONTROL | × | × |
| | AUTO SWITCH OF CIRCULATION OF INSIDE/OUTSIDE AIR OF AC | × | × |
| | CHANGE OF SEAT POSITION | × | × |
| | PROVISION OF CONGESTION INFORMATION | × | × |
| | DISPLAY OF MOVING IMAGE | × | × |
| | AUTO ADJUSTMENT OF AUDIO VOLUME | × | × |
| | JERK REDUCING RUNNING CONTROL | × | × |

FIG 13

|  | 1 | 2 | 3 | 4 | 5 | 6 | 7 | 8 |
|---|---|---|---|---|---|---|---|---|
| CLEAR | WINDY | FOG | RAIN | SNOW | STRONG WINDY | DENSE FOG | HEAVY RAIN | HEAVY SNOW |
| RAIN | SNOW | FOG | WINDY | STRONG WINDY | HEAVY RAIN | HEAVY SNOW | DENSE FOG | CLEAR |
| HEAVY RAIN | HEAVY SNOW | DENSE FOG | STRONG WINDY | FOG | RAIN | SNOW | WINDY | CLEAR |
| SNOW | RAIN | FOG | WINDY | STRONG WINDY | HEAVY SNOW | HEAVY RAIN | DENSE FOG | CLEAR |
| HEAVY SNOW | HEAVY RAIN | DENSE FOG | STRONG WINDY | FOG | SNOW | RAIN | WINDY | CLEAR |
| FOG | RAIN | SNOW | WINDY | STRONG WINDY | DENSE FOG | HEAVY RAIN | HEAVY SNOW | CLEAR |
| DENSE FOG | HEAVY SNOW | HEAVY RAIN | FOG | WINDY | STRONG WINDY | SNOW | RAIN | CLEAR |
| WINDY | STRONG WINDY | FOG | RAIN | SNOW | DENSE FOG | HEAVY RAIN | HEAVY SNOW | CLEAR |
| STRONG WINDY | WINDY | FOG | RAIN | SNOW | DENSE FOG | HEAVY RAIN | HEAVY SNOW | CLEAR |

FIG. 14

| 1 | 2 | 3 | 4 | 5 | 6 |
|---|---|---|---|---|---|
| WEATHER CONDITIONS | DRIVE CONDITIONS | ROAD TYPES | ROAD CONDITIONS | HOME VEHICLE CONDITIONS | SUNLIGHT CONDITIONS |

VEHICLE AUTOMATED DRIVING SYSTEM

TECHNICAL FIELD

The present invention relates to a vehicle automated driving system.

BACKGROUND ART

PLT 1 discloses a conventional vehicle automated driving system wherein when a driver operates a switch to change from a manual driving mode to an automated driving mode, automated driving is performed including vehicle distance control, lane tracking control, and other various driving assistance operations performed automatically.

CITATIONS LIST

Patent Literature

PLT 1: U.S. Pat. No. 8,670,891
PLT 2: Japanese Patent Publication No. 11-102157A
PLT 3: Japanese Patent Publication No. 09-086223A

SUMMARY OF INVENTION

Technical Problem

However, the above-mentioned conventional vehicle control system used the fact of the automated driving mode being switched to so as to judge that the driver had given permission for all driving assistance operations. For this reason, when performing automated driving, the driver was only able to switch from the manual driving mode to the automated driving mode and could not freely set permissions for the individual driving assistance operations in accordance with the preferences of the driver. However, to keep driving assistance operations not required by the driver from being performed, it is preferable to enable the driver to freely set permissions for individual driving assistance operations at the time of automated driving.

On the other hand, if a driver could freely set permissions for individual driving assistance operations at the time of automated driving, the operation by the driver for setting the system would become troublesome. Further, in poor weather and other predetermined surrounding environment conditions, some driving assistance operations could be difficult.

Therefore, an object of the present invention is to provide an automated driving system enabling a driver to easily set permissions for individual driving assistance operations in automated driving in accordance with the preferences of the driver, the surrounding environment conditions etc.

In order to solve the above problem, in a first aspect, there is provided A vehicle automated driving system comprising: a surrounding environment information acquiring device acquiring surrounding environment information relating to surrounding environment conditions of the vehicle; a vehicle information acquiring device acquiring vehicle information relating to conditions of the vehicle; a driver information acquiring device acquiring driver information relating to conditions of a driver of the vehicle; a package selecting part selecting a driving assistance package packaging permissions for a plurality of driving assistance operations; a package proposing part proposing the driving assistance package selected by the package selecting part to the driver; an automated driving executing part executing driving assistance operations for which performance is permitted in the driving assistance package proposed by the packaging proposing part and approved by the driver; and a rejection count detecting part judging whether performance of driving assistance operations for which performance is permitted in a driving assistance package has been rejected by the driver and detecting the number of times performance of driving assistance operations for which performance is permitted in the driving assistance package has been rejected by the driver as the rejection count of the driving assistance package, wherein the package selecting part determines the driving assistance package based on at least one of the surrounding environment information, the vehicle information, and the driver information, selects the determined driving assistance package if the rejection count of the determined driving assistance package is less than a predetermined threshold value, and selects a driving assistance package different from the determined driving assistance package if the rejection count of the determined driving assistance package is the threshold value or more.

In a second aspect, the rejection count detecting part judges that performance of driving assistance operations for which performance is permitted in the driving assistance package has been rejected by the driver, if the driving assistance package proposed by the package proposing part was not approved by the driver, in the first aspect.

In a third aspect, the rejection count detecting part judges that performance of driving assistance operations for which performance is permitted in the driving assistance package has been rejected by the driver, if performance of driving assistance operations for which performance is permitted in the driving assistance package was obstructed by an input operation performed by the driver, in the first or second aspect.

In a forth aspect, the input operation performed by the driver is at least one of acceleration, steering, and braking, in the third aspect.

In a fifth aspect, the package selecting part selects a driving assistance package in which performance of driving assistance operations whose performance is obstructed by the input operation performed by the driver is not permitted, if the rejection count of the determined driving assistance package is the threshold value or more, in the third or fourth aspect.

In a sixth aspect, the system further comprises a driver identifying part identifying the driver of the vehicle based on the driver information, and the rejection count detecting part judges whether performance of driving assistance operations for which performance is permitted in a driving assistance package has been rejected by the driver identified by the driver identifying part, and detects the number of times performance of driving assistance operations for which performance is permitted in the driving assistance package has been rejected by the driver identified by the driver identifying part as the rejection count of the driving assistance package, in any one of the first to fifth aspects.

Advantageous Effects of Invention

According to the present invention, there is provided an automated driving system enabling a driver to easily set permissions for individual driving assistance operations in automated driving in accordance with the preferences of the driver, the surrounding environment conditions etc.

BRIEF DESCRIPTION OF DRAWINGS

FIG. 4 is a view showing a list of driving assistance operations performed during an automated driving mode by an automated driving system.

FIG. 5 is a view showing a group of packages relating to weather conditions.

FIG. 6 is a view showing a group of packages relating to sunlight conditions.

FIG. 7 is a view showing a group of packages relating to road types.

FIG. 8 is a view showing a group of packages relating to road conditions.

FIG. 9 is a view showing a group of packages relating to driver conditions.

FIG. 10 is a view showing a group of packages relating to home vehicle conditions.

FIG. 13 is a map showing a priority degree of switching of unit packages in a group of packages relating to weather conditions.

FIG. 14 is a map showing a priority degree of a group of packages in which unit packages are switched.

DESCRIPTION OF EMBODIMENTS

Figure 1:
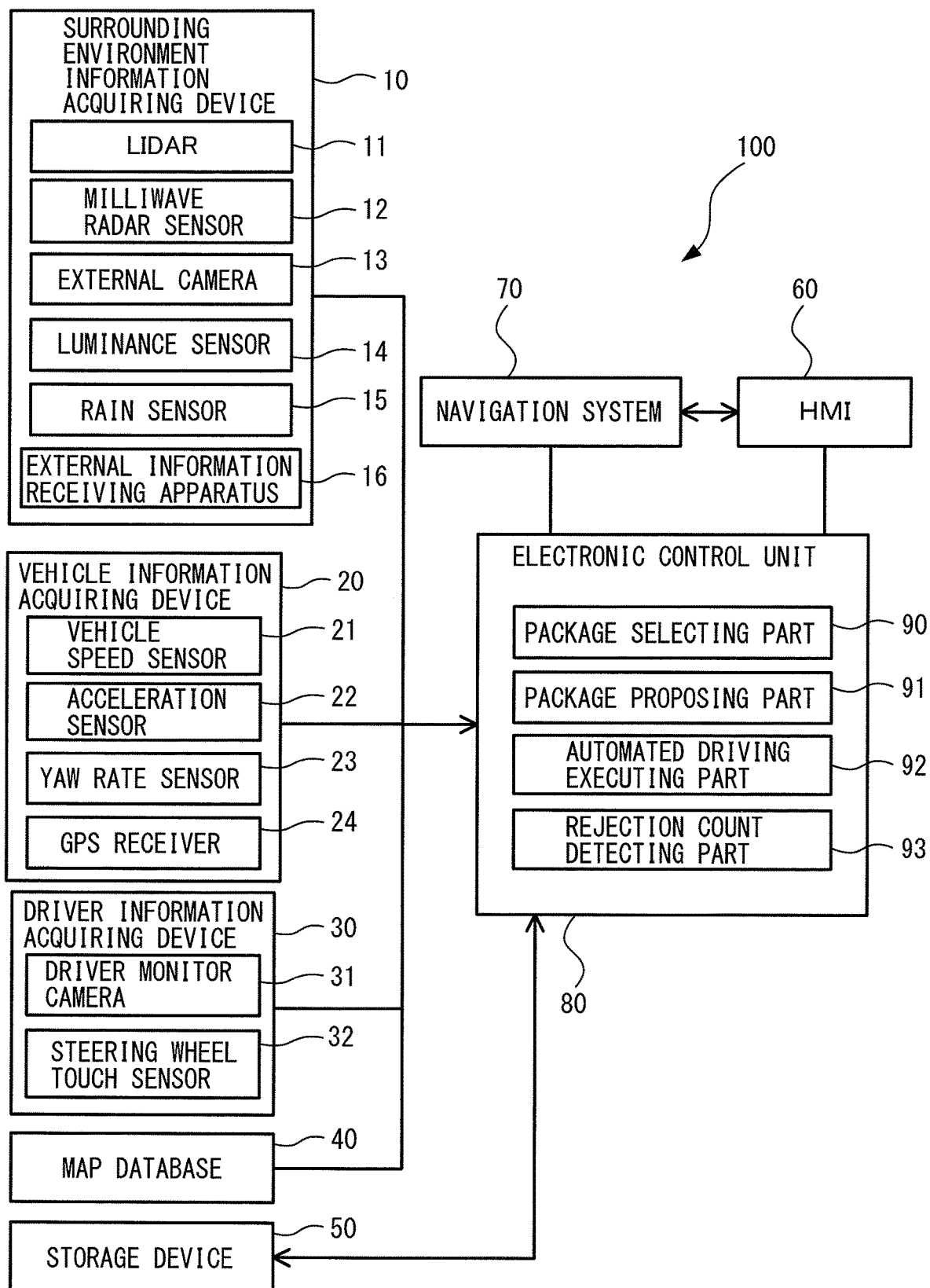
FIG. 1 is a block diagram showing the configuration of a vehicle automated driving system according to a first embodiment of the present invention.

Below, referring to the drawings, embodiments of the present invention will be explained in detail. Note that, in the following explanation, similar components are assigned the same reference notations.

First Embodiment

First, referring to FIG. 1 to FIG. 15, a first embodiment of the present invention will be explained.

<Configuration of Automated Driving System>

Figure 2:
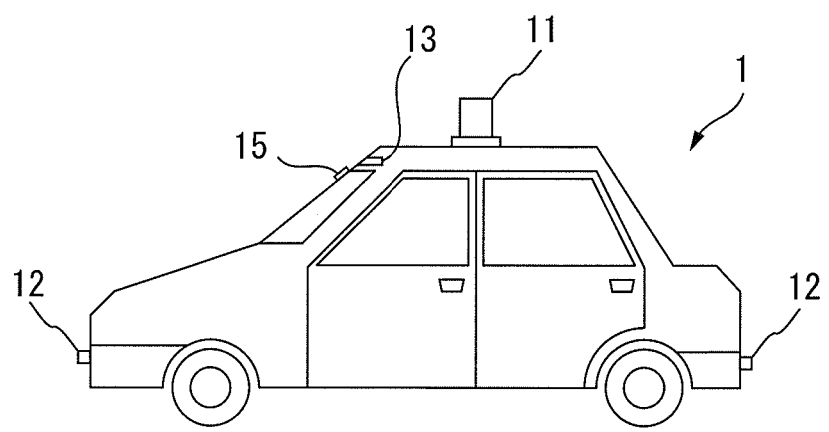
FIG. 2 is a schematic side view of a vehicle equipped with an automated driving system.
Figure 3:
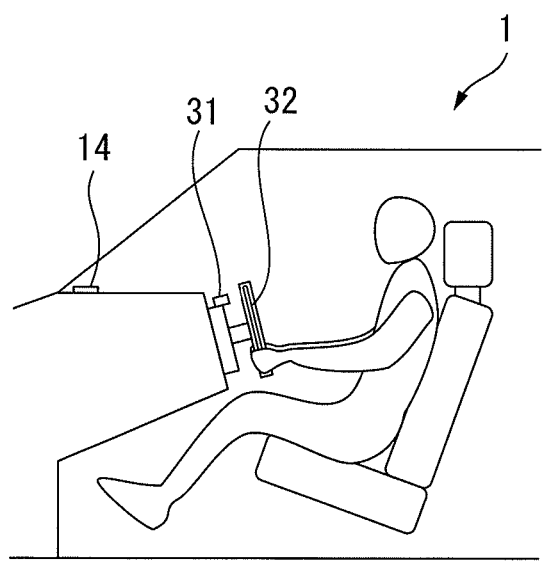
FIG. 3 is a view schematically showing the inside of a vehicle equipped with an automated driving system.

FIG. 1 is a block diagram showing the configuration of a vehicle automated driving system 100 according to the first embodiment of the present invention. FIG. 2 is a schematic side view of a vehicle 1 equipped with an automated driving system 100. FIG. 3 is a view schematically showing the inside of a vehicle 1 equipped with an automated driving system 100.

As shown in FIG. 1, the automated driving system 100 is provided with a surrounding environment information acquiring device 10, vehicle information acquiring device 20, driver information acquiring device 30, map database 40, storage device 50, human machine interface (HMI) 60, navigation system 70, and electronic control unit (ECU) 80.

The surrounding environment information acquiring device 10 acquires surrounding environment information relating to the conditions of the surrounding environment of the vehicle 1. The surrounding environment information includes the weather, the road on which the vehicle 1 is running, obstacles around the vehicle 1 (curbs, buildings, other vehicles, pedestrians, fallen objects, etc.) and other information. The surrounding environment information acquiring device 10 is provided with a LIDAR (laser imaging detection and ranging device) 11, milliwave radar sensors 12, an outside camera 13, a luminance sensor 14, a rain sensor 15, and an external information receiving apparatus 16.

The LIDAR 11 uses laser light to detect the road and obstacles in the surroundings of the vehicle 1. As shown in FIG. 2, in the present embodiment, the LIDAR 11 is attached to the roof of the vehicle 1. The LIDAR 11 successively irradiates laser light toward the entire surroundings of the vehicle 1 and measures the distances to the road and obstacles from the reflected light. The LIDAR 11 generates 3D images of the road and obstacles in the entire surroundings of the vehicle 1 based on the measurement results, and transmits the generated 3D image information as surrounding environment information to the electronic control unit 80. Note that, the position where the LIDAR 11 is mounted to the vehicle 1 may be a position different from the position shown in FIG. 2.

The milliwave radar sensors 12 use electrical waves to detect obstacles around the vehicle 1 over a further distance than the LIDAR 11. As shown in FIG. 2, in the present embodiment, the milliwave radar sensors 12 are attached to the front bumper and rear bumper of the vehicle 1. The milliwave radar sensors 12 emit electrical waves to the surroundings of the vehicle 1 (in the present embodiment, to the front, rear, and sides of the vehicle 1) and measure the distances to obstacles in the surroundings of the vehicle 1 and relative speeds with the obstacles from the reflected waves. The milliwave radar sensors 12 transmit the results of measurement as surrounding environment information to the electronic control unit 80.

Note that, the positions where the milliwave radar sensors 12 are attached to the vehicle 1 are not limited to the positions shown in FIG. 2 so long as positions enabling the necessary surrounding environment information to be acquired. For example, the milliwave radar sensors 12 may also be attached to the grilles of the vehicle 1 or the insides of the vehicle lights (for example headlights or brake lights) or the chassis part (frame) of the vehicle 1.

The outside camera 13 captures an image of the field in front of the vehicle 1. As shown in FIG. 2, in the present embodiment, the outside camera 13 is attached to the center of the front end of the roof of the vehicle 1. The outside camera 13 performs image processing of the captured image to detect information on obstacles in front of the vehicle 1, traffic information in the surroundings of the vehicle 1 (lane width, road shape, road signs, white lines, statuses of traffic lights, etc.), the yaw angle (relative direction of vehicle 1 to running lane), running information of vehicle 1 (for example, offset of vehicle 1 from center of running lane), meteorological information in the surroundings of vehicle 1 (information on rain, snow, fog, etc.), etc. The outside camera 13 transmits the detected information as surrounding environment information to the electronic control unit 80.

Note that, the position where the outside camera 13 is mounted at the vehicle 1 is not limited to the position shown in FIG. 2 so long as a position able to capture an image of the field in front of the vehicle 1. For example, the outside camera 13 may be attached to the top center of the back surface of the windshield at the inside of the vehicle 1.

The luminance sensor 14 detects the luminance of the surroundings of the vehicle 1. As shown in FIG. 2, in the present embodiment, the luminance sensor 14 is attached to the top surface of an instrument panel in the vehicle 1. The luminance sensor 14 transmits the detected luminance information of the surroundings of the vehicle 1 as surrounding environment information to the electronic control unit 80. Note that, the position where the luminance sensor 14 is mounted at the vehicle 1 may be a position different from the position shown in FIG. 3.

The rain sensor 15 detects the presence of rainfall and the amount of rainfall. As shown in FIG. 2, in the present embodiment, the rain sensor 15 is attached to the top center of the front surface of the windshield of the vehicle 1. The rain sensor 15 emits light generated from a built-in light emitting diode toward the front surface of the windshield and measures the change of the reflected light at that time so as to detect rainfall information such as the presence of rainfall and the amount of rainfall. The rain sensor 15 transmits the detected rainfall information as surrounding environment information to the electronic control unit 80. Note that, the position where the rain sensor 15 is attached to the vehicle 1 may be a position different from the position shown in FIG. 2.

The external information receiving apparatus 16 receives, for example, congestion information and meteorological information (weather, air temperature, wind speed, and other information) and other such external information sent from a road traffic information communication system center or other external communication center. The external information receiving apparatus 16 transmits the received external information as surrounding environment information to the electronic control unit 80.

The vehicle information acquiring device 20 acquires vehicle information relating to the conditions of the vehicle 1 (host vehicle). The vehicle information includes the speed, acceleration, posture, current position, and other information of the vehicle 1. As shown in FIG. 1, the vehicle information acquiring device 20 is provided with a speed sensor 21, an acceleration sensor 22, a yaw rate sensor 23, and a GPS receiver 24.

The speed sensor 21 detects the speed of the vehicle 1. The speed sensor 21 transmits the detected speed of the vehicle 1 as vehicle information to the electronic control unit 80.

The acceleration sensor 22 detects the acceleration of the vehicle 1 at the time of acceleration and the time of braking. The acceleration sensor 22 transmits the detected acceleration of the vehicle 1 as vehicle information to the electronic control unit 80.

The yaw rate sensor 23 detects the posture of the vehicle 1. Specifically, the yaw rate sensor 23 detects the speed of change of the yaw angle at the time of turning of the vehicle 1, that is, the rotational angle speed (yaw rate) around the vertical axis of the vehicle 1. The yaw rate sensor 23 transmits the detected posture of the vehicle 1 as vehicle information to the electronic control unit 80.

The GPS receiver 24 receives signals from three or more GPS satellites, identifies the latitude and longitude of the vehicle 1, and detects the current position of the vehicle 1. The GPS receiver 24 transmits the detected current position of the vehicle 1 as vehicle information to the electronic control unit 80.

The driver information acquiring device 30 acquires driver information relating to the conditions of the driver of the vehicle 1. The driver information includes the facial expression, posture, etc. of the driver. As shown in FIG. 1, the driver information acquiring device 30 is provided with a driver monitor camera 31 and a steering wheel touch sensor 32.

The driver monitor camera 31 captures an image of the appearance of the driver. As shown in FIG. 3, in the present embodiment, the driver monitor camera 31 is attached to the top surface of a steering wheel column cover. The driver monitor camera 31 performs image processing of the captured image of the driver so as to detect the facial expression of the driver (direction of face of driver, line of sight, degree of opening of eyes, etc.), posture, and other appearance information of the driver. The driver monitor camera 31 transmits the detected appearance information of the driver as driver information to the electronic control unit 80. Note that, the position at which the driver monitor camera 31 is attached to the vehicle 1 may be a position different from the position shown in FIG. 3.

The steering wheel touch sensor 32 detects if the driver is gripping the steering wheel. As shown in FIG. 3, the steering wheel touch sensor 32 is attached to the steering wheel. The steering wheel touch sensor 32 transmits the detected gripping information of the steering wheel as driver information to the electronic control unit 80. Note that, the position at which the steering wheel touch sensor 32 is attached to the vehicle 1 may be a position different from the position shown in FIG. 3.

The map database 40 is a database relating to map information. The map database 40 is, for example, stored in a hard disk drive (HDD) carried in the vehicle 1. The map information includes position information of the road, shape information of the road (for example, differentiation between curves and straight parts, curvature of curves, etc.), position information of intersections and junctions, road types, and other information.

The storage device 50 stores automated driving road maps. The automated driving road maps are prepared by the electronic control unit 80 based on the 3D image generated by the LIDAR 11. The electronic control unit 80 updates the automated driving road maps constantly or periodically.

The HMI 60 is an interface for input and output of information between the driver or vehicle passenger and the automated driving system 100. The HMI 60, for example, includes a display displaying text or image information, a speaker generating sound, operating buttons for the driver or vehicle passenger to input operations, a touch panel, a microphone, etc.

The navigation system 70 guides the vehicle 1 to a destination set by the driver through the HMI 60. The navigation system 70 calculates the target route to the target destination based on the current position information of the vehicle 1 detected by the GPS receiver 24 and the map information of the map database 40. The navigation system 70 transmits the calculated information relating to the target route as navigation information to the electronic control unit 80.

The electronic control unit 80 is a microcomputer provided with components connected with each other by bidirectional buses such as a center processing unit (CPU), read only memory (ROM), random access memory (RAM), input port, and output port. The electronic control unit 80 outputs control signals for controlling various actuators for performing individual driving assistance operations from the output port to control the vehicle 1 based on surrounding environment information, vehicle information, driver information, navigation information, and other various information required for automated driving, which are input to the electronic control unit 80.

<Explanation of Driving Assistance Operations in Automated Driving>

FIG. 4 is a view showing a list of driving assistance operations performed in the automated driving mode by the automated driving system 100 in the present embodiment. In the present embodiment, the driving assistance operations are roughly divided into three groups of functions of running assistance functions, vision assistance functions, and congestion assistance functions.

The driving assistance operations grouped together in the section of running assistance functions are driving assistance operations having functions for performing at least one of acceleration, steering, and braking (running assistance functions). In the present embodiment, as driving assistance operations having running assistance functions, vehicle distance control, lane tracking control, auto lane change, auto passing, auto branching, and auto merging may be mentioned. However, the types and numbers of the driving assistance operations having running assistance functions may differ from those shown in FIG. 4.

Note that, "vehicle distance control" is control automatically adjusting the vehicle speed within the range of a limit speed so as to be able to maintain a suitable vehicle distance corresponding to the vehicle speed while tracking a preceding vehicle in response to the change of vehicle speed of the preceding vehicle. "Lane tracking control" is control automatically adjusting the steering amount or vehicle speed so that the vehicle 1 runs on a suitable running line corresponding to the lane width of the running lane.

The driving assistance operations grouped together in the section of vision assistance functions are driving assistance operations having functions of securing the field of vision of the driver and in turn safety (vision assistance functions) among driving assistance operations not having running assistance functions (that is, not performing any of acceleration, steering, and braking). In the present embodiment, as driving assistance operations having vision assistance functions, lane departure warning, blind spot monitoring, and other of eleven driving assistance operations may be illustrated. However, the types and numbers of the driving assistance operations having vision assistance functions may differ from those shown in FIG. 4.

The driving assistance operations grouped together in the section of congestion assistance functions are driving assistance operations having functions of easing fatigue of the driver and vehicle passengers at the time of congestion (congestion assistance functions). In the present embodiment, as driving assistance operations having congestion assistance functions, auto start from stopping at the time of congestion and control for temporarily turning on the hazard light and other of eight driving assistance operations may be illustrated. However, the types and numbers of the driving assistance operations having congestion assistance functions may differ from those shown in FIG. 4.

In this regard, it is preferable for the driver to be able to freely set permissions for individual driving assistance operations before the start of automated driving and during automated driving so that driving assistance operations not required by the driver are not automatically performed at the time of automated driving. On the other hand, if the driver sets permissions for individual driving assistance operations at automated driving one at a time, the operation by the driver for setting the system would become troublesome and in turn the convenience of automated driving would fall. Further, the conditions of the surrounding environment, conditions of the host vehicle, and conditions of the driver change at each instant while the vehicle is running. Situations arise where some driving assistance operations become difficult (for example, poor weather etc.)

<Explanation of Driving Assistance Package>

Therefore, in the present embodiment, a driving assistance package which packages permissions for a plurality of driving assistance operations is determined based on at least one of the surrounding environment information, host vehicle information, and driver information, and the determined driving assistance package is proposed to the driver. Specifically, unit packages suitable for the weather conditions, sunlight conditions, road types, road conditions, driver conditions, and host vehicle conditions are selected from the groups of packages shown in FIG. 5 to FIG. 10 and a driving assistance package combining the selected unit packages is proposed to the driver. The driving assistance package sets permissions for different driving assistance operations.

Below, referring to FIG. 5 to FIG. 10, the groups of packages will be explained. Note that, in FIG. 5 to FIG. 10, the O marks show permission to perform the driving assistance operations, while the X marks show no permission to perform the driving assistance operations. Further, the groups of packages are stored in the ROM of the electronic control unit 80.

FIG. 5 is a view showing the group of packages relating to the conditions of the weather. The group of packages relating to the weather conditions roughly divides weather conditions into the nine conditions of "clear", "rain", "heavy rain", "snow", "heavy snow", "fog", "thick fog", "wind", and "strong wind" and packages permissions for individual driving assistance operations for each of the weather conditions. For this reason, the group of packages relating to the weather conditions includes nine unit packages. In the present embodiment, the weather conditions during automated driving are specified based on the meteorological information around the vehicle 1 detected by the outside camera 13 and the meteorological information included in external information received by the external information receiving apparatus 16.

FIG. 6 is a view showing the group of packages relating to the conditions of sunlight. The group of packages relating to the sunlight conditions roughly divides sunlight conditions into "day" and "night" and packages permissions for individual driving assistance operations for each of the sunlight conditions. For this reason, the group of packages relating to the sunlight conditions includes two unit packages. In the present embodiment, the sunlight conditions during automated driving are specified based on the luminance information detected by the luminance sensor 14 and the time of day.

FIG. 7 is a view showing the group of packages relating to the types of the road. The group of packages relating to the road type roughly divides road types into the four types of "general roads", "trunk roads", "inter-city highways" (Tokyo-Nagoya highway, Nagoya-Kobe highway, etc.), and "city highways" (Tokyo metropolitan highway and Osaka-Kobe highway etc.) and packages permissions for individual driving assistance operations for each of the road types. For this reason, the group of packages relating to the road types includes four unit packages. In the present embodiment, the road type during automated driving is specified based on the traffic information around the vehicle 1 detected by the outside camera 13 and the road type information contained in the map information of the map database 40.

FIG. 8 is a view showing the group of packages relating to the conditions of the road. The group of packages relating to the road conditions roughly divides the road conditions into congested and noncongested and packages permissions for individual driving assistance operations for each of the road conditions. For this reason, the group of packages relating to the road conditions includes two unit packages. In the present embodiment, the road conditions during automated driving are specified based on the information of the 3D image generated by the LIDAR 11, the surrounding environment information detected by the milliwave radar sensors 12, the information on obstacles in front of the vehicle 1 detected by the outside camera 13 and traffic information around the vehicle 1, the congestion information included in the external information received by the external information receiving apparatus 16, and the speed of the vehicle 1 detected by the speed sensor 21.

Note that, in the present embodiment, "congested" means a condition where there is another vehicle around the vehicle 1 (preceding vehicle or following vehicle) and the speeds of the vehicle 1 and the other vehicle around the vehicle 1 are sustained constant speeds (for example, on general roads and trunk roads, 20 km/h and on inter-city highways and city highways, 40 km/h) or less. On the other hand, "noncongested" means a condition other than "congested".

FIG. 9 is a view showing a group of packages relating to the conditions of the driver. The group of packages relating to the driver conditions roughly divides the driver conditions into the five conditions of "sleepy", "tired", "overworked", "distracted", and "normal" and packages permissions for individual driving assistance operations for each of the driver conditions. For this reason, the group of packages relating to the driver conditions includes five unit packages. In the present embodiment, the driver conditions during automated driving are specified by the information of the appearance of the driver detected by the driver monitor camera 31 and information of gripping of the steering wheel detected by the steering wheel touch sensor 32. Specifically, the driver conditions are specified by detecting the facial expression of the driver (direction of face, degree of opening/closing of the eyes, etc.) from the information on the appearance of the driver while referring to the information of gripping of the steering wheel and comparing the detected expression of the driver with an expression according to the driver conditions stored in the ROM in advance.

Note that, the parameters for specifying driver conditions are not limited to the information on the appearance of the driver and information of gripping of the steering wheel. For example, it is also possible to detect the heartbeat, pulse, brainwave, etc. of the driver and compare the same with the heartbeat, pulse, brainwave, etc. corresponding to the driver conditions stored in advance in the ROM so as to specify the driver conditions. In this case, the driver information acquiring device is provided with a heartbeat sensor, a pulse sensor, a brainwave sensor, etc.

Note that, in the present embodiment, "sleepy" means a condition where the concentration of the driver in the driving operation has fallen due to sleepiness but not to an extent requiring the driver to immediately stop driving. "Tired" means a condition where the concentration of the driver in the driving operation has fallen due to tiredness but not to an extent requiring the driver to immediately stop driving. "Overworked" means a condition where the concentration of the driver in the driving operation has fallen due to tiredness to an extent requiring the driver to immediately stop driving. "Distracted" means, for example, when the driver is performing a second task other than the driving operation such as operating a mobile phone, tablet PC, or other mobile device or is viewing a moving image, when the driver is looking at the sides, and other conditions where the concentration of the driver in the driving operation has fallen due to factors other than sleepiness and tiredness. "Normal" means a condition other than "sleepy", "tired", "overworked", and "distracted".

FIG. 10 is a view showing the group of packages relating to the conditions of the host vehicle. The group of packages relating to the host vehicle conditions roughly divides the host vehicle conditions into "unstable" and "stable" and packages permissions for individual driving assistance operations for each vehicle condition. For this reason, the group of packages relating to the host vehicle conditions includes two unit packages. In the present embodiment, the host vehicle conditions are specified based on the acceleration of the vehicle 1 detected by the acceleration sensor 22 and the posture of the vehicle 1 detected by the yaw rate sensor 23.

Note that, in the present embodiment, the "unstable" of the host vehicle conditions means a condition where pitching, rolling, yawing, etc. of the vehicle 1 are continuing and the behavior of the vehicle 1 is disturbed. "Pitching" means the vehicle rocking to the front and back about the horizontal axis in the left-right direction passing through the center of gravity of the vehicle. "Rolling" means the vehicle rocking to the left and right about the horizontal axis in the front-back direction passing through the center of gravity of the vehicle. "Yawing" means the vehicle rocking to the left and right about the vertical axis passing through the center of gravity of the vehicle. On the other hand, "stable" of the host vehicle conditions means a condition other than unstable conditions, that is, a condition where pitching, rolling, yawing, etc. of the vehicle 1 do not occur and the behavior of the vehicle 1 is not disturbed.

<Control by Automated Driving System>

The automated driving system 100 is further provided with a package selecting part 90, a package proposing part 91, an automated driving executing part 92, and a rejection count detecting part 93. In this embodiment, as shown in FIG. 1, the package selecting part 90, package proposing part 91, automated driving executing part 92 and rejection count detecting part 93 are a part of the electronic control unit 80.

The package selecting part 90 selects a driving assistance package packaging permissions for a plurality of driving assistance operations. As explained above, a driving assistance package sets permissions for different driving assistance operations. The package proposing part 91 proposes the driving assistance package selected by the package selecting part 90 to the driver. The automated driving executing part 92 performs automated driving of the vehicle 1 based on the driving assistance package proposed by the package proposing part 91 and approved by the driver. Specifically, the automated driving executing part 92 performs driving assistance operations for which performance is permitted in the driving assistance package proposed by the package proposing part 91 and approved by the driver.

The rejection count detecting part 93 judges whether performance of the driving assistance operations for which performance is permitted in the driving assistance package has been rejected by the driver, and detects the number of times performance of the driving assistance operations for which performance is permitted in the driving assistance package has been rejected by the driver as the rejection count of the driving assistance package. Specifically, the rejection count detecting part 93 judges that performance of the driving assistance operations for which performance is permitted in the driving assistance package has been rejected by the driver, if the driving assistance package proposed by the package proposing part 91 was not approved by the driver.

Further, the rejection count detecting part 93 also judges that performance of driving assistance operations for which performance is permitted in the driving assistance package has been rejected by the driver, if performance of driving assistance operations for which performance is permitted in the driving assistance package was obstructed by an input operation performed by the driver. The input operation performed by the driver includes, for example, operation of a switch, voice input, acceleration (operation of accelerator), steering (operation of steering wheel), braking (operation of brake), etc. Therefore, for example, the rejection count detecting part 93 judges that performance of the driving assistance operations for which performance is permitted in the driving assistance package has been rejected by the driver when override occurs during execution of the driving assistance operations for which performance is permitted in the driving assistance package. Note that, "override" means at least one operation of acceleration, steering, and braking performed by the driver resulting in the performance of the driving assistance operations being obstructed. As a more specific example, if the driver performs steering and obstructs change of lane of the vehicle when a driving assistance operation for change of lane of the vehicle is being performed, the rejection count detecting part 93 judges that performance of the driving assistance operation for which performance is permitted in the driving assistance package has been rejected by the driver.

The package selecting part 90 determines the driving assistance package based on at least one of the surrounding environment information, vehicle information, and driver information, selects the determined driving assistance package if the rejection count of the determined driving assistance package is less than a predetermined threshold value, and selects a driving assistance package different from the determined driving assistance package if the rejection count of the determined driving assistance package is the threshold value or more. The surrounding environment information is acquired by the surrounding environment information acquiring device 10, the vehicle information is acquired by the vehicle information acquiring device 20, and the driver information is acquired by the driver information acquiring device 30. Further, the rejection count of the determined driving assistance package is detected by the rejection count detecting part 93. The threshold value is an integer of 1 or more.

Due to the above-mentioned control, a driving assistance package corresponding to the preferences of the driver and the surrounding environment information etc. is selected by the package selecting part 90 and proposed to the driver by the package proposing part 91. The driver can set permissions for performing the different driving assistance operations at one time by just approving the driving assistance package proposed by the package proposing part 91. Therefore, the driver can easily set permissions for different driving assistance operations in automated driving in accordance with the preferences of the driver and surrounding environment conditions etc.

<Control Routine of Vehicle Control>

Figure 11:
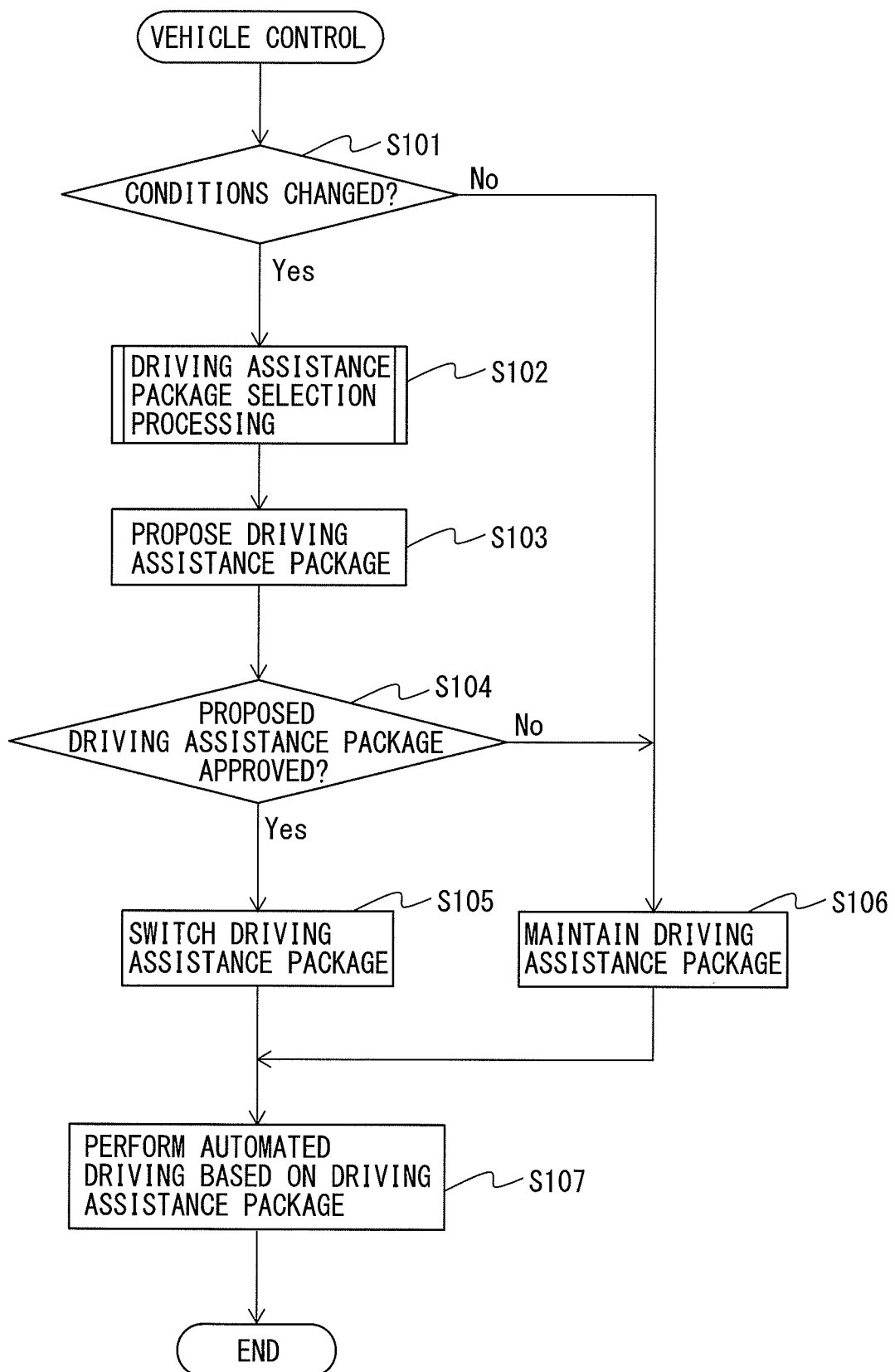
FIG. 11 is a flow chart showing a control routine of vehicle control in the first embodiment of the present invention.

Below, referring to the flow chart of FIG. 11, vehicle control by the automated driving system 100 will be explained in detail. FIG. 11 is a flow chart showing a control routine of vehicle control in a first embodiment of the present invention. The control routine is repeatedly executed by the electronic control unit 80 at predetermined time intervals while the automated driving mode is selected by driver.

The automated driving mode and manual driving mode are switched by the driver. Note that, the "automated driving mode" is the operating mode where at least one of the driving operations relating to acceleration, steering, and braking is performed by the automated driving system 100. Further, the "manual driving mode" is the operating mode where all driving operations relating to acceleration, steering, and braking are performed by the driver.

First, at step S101, the automated driving executing part 92 judges whether one or more of the surrounding environment conditions, conditions of the vehicle, and conditions of the driver have changed based on the surrounding environment information, vehicle information, and driver information. The surrounding environment information is acquired by the surrounding environment information acquiring device 10, the vehicle information is acquired by the vehicle information acquiring device 20, and the driver information is acquired by the driver information acquiring device 30. For example, if the weather conditions around the vehicle 1 detected by the outside camera 13 change from clear to rain, it is judged that the surrounding environment conditions have changed.

If at step S101 it is judged that one or more of the surrounding environment conditions, conditions of the vehicle, and conditions of the driver have not changed, the control routine proceeds to step S106. At step S106, the automated driving executing part 92 maintains the current driving assistance package.

Next, at step S107, the automated driving executing part 92 performs the automated driving of the vehicle 1 based on the driving assistance package maintained at step S106. Specifically, the automated driving executing part 92 performs the driving assistance operations for which performance is permitted in the driving assistance package maintained at step S106. After step S107, the control routine is ended.

On the other hand, if at step S101 it is judged that one or more of the surrounding environment conditions, conditions of the vehicle, and conditions of the driver have changed, the control routine proceeds to step S102. At step S102, the later explained driving assistance package selection processing is performed, and the package selecting part 90 selects the driving assistance package. Next, at step S103, the package proposing part 91 proposes the driving assistance package selected at step S102 to the driver.

Next, at step S104, the automated driving executing part 92 judges whether the proposed driving assistance package has been approved by the driver. If it is judged that the proposed driving assistance package has been approved by the driver, the control routine proceeds to step S105. At step S105, the automated driving executing part 92 switches the driving assistance package to the driving assistance package proposed by the package proposing part 91 and approved by the driver.

Next, at step S107, the automated driving executing part 92 performs automated driving of the vehicle 1 based on the driving assistance package switched at step S105. Specifically, the automated driving executing part 92 performs the driving assistance operations for which performance is permitted in the driving assistance package switched to at step S105. After step S107, the control routine is ended.

On the other hand, if at step S104 it was judged that the proposed driving assistance package was not approved by the driver, the control routine proceeds to step S106. At step S106, the current driving assistance package is maintained, and at step S107, automated driving is performed based on the maintained driving assistance package. After step S107, the control routine is ended.

<Driving Assistance Package Selection Processing>

Figure 12:
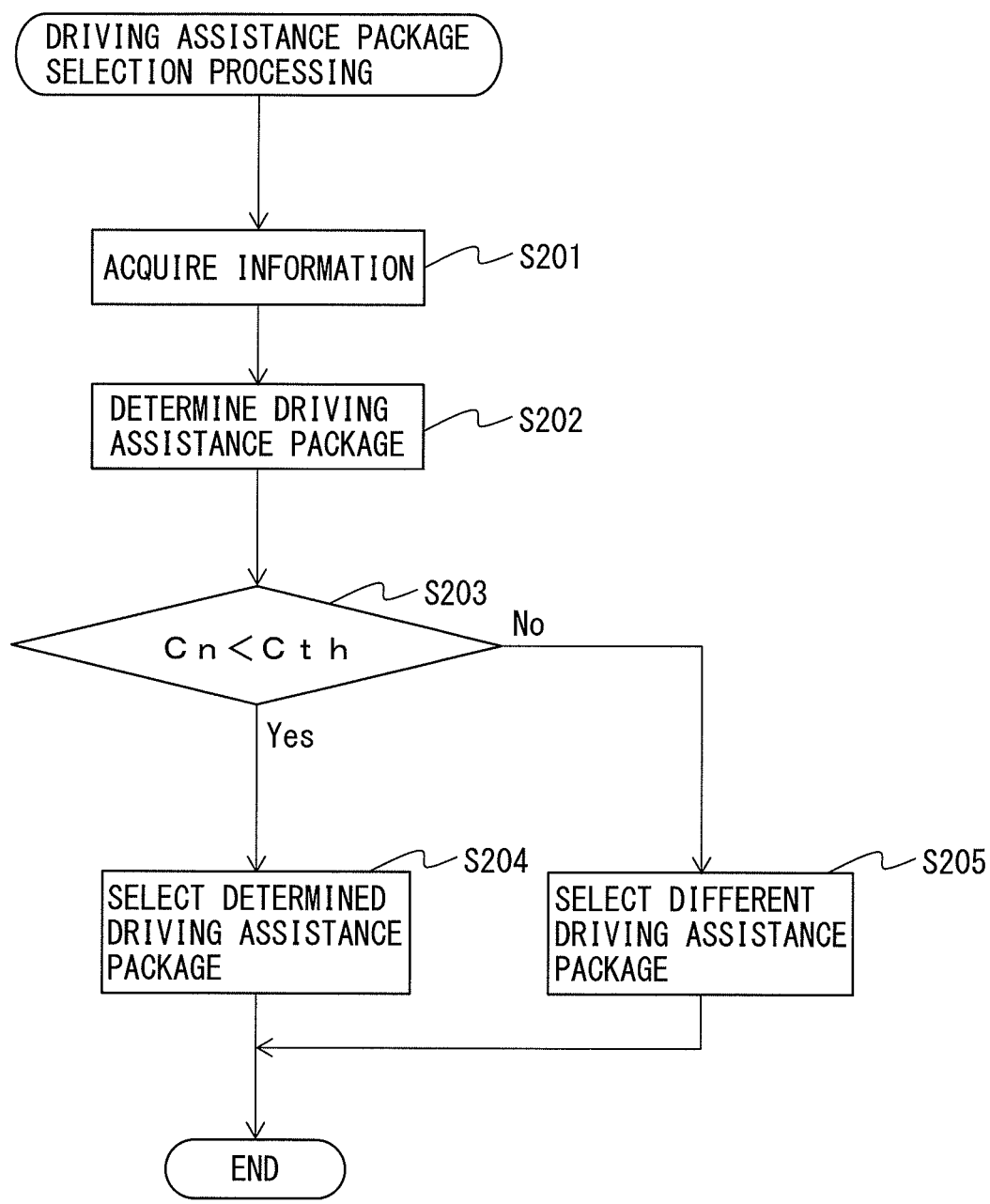
FIG. 12 is a flow chart showing a control routine of driving assistance package selection processing in the first embodiment of the present invention.

Below, referring to the flow chart of FIG. 12, the driving assistance package selection processing executed at step S102 of FIG. 11 will be explained. FIG. 12 is a flow chart showing the control routine of driving assistance package selection processing in the first embodiment of the present invention.

First, at step S201, the package selecting part 90 acquires surrounding environment information, vehicle information, and driver information. The surrounding environment information is acquired from the surrounding environment information acquiring device 10, the vehicle information is acquired from the vehicle information acquiring device 20, and the driver information is acquired from the driver information acquiring device 30. Next, at step S202, the package selecting part 90 determines the driving assistance package based on the surrounding environment information, vehicle information, and driver information acquired at step S201.

Specifically, the package selecting part 90 first specifies the conditions of the surrounding environment (in the present embodiment, conditions of the weather, conditions of sunlight, type of road, and conditions of the road), conditions of the host vehicle, and conditions of the driver based on the surrounding environment information, vehicle information, and driver information. Next, the package selecting part 90 selects the unit package of the weather condition specified as the current weather condition from the group of packages relating to the weather conditions. For example, the package selecting part 90 selects the unit package of "heavy rain" from the group of packages relating to the weather conditions when specifying that the current weather condition are "heavy rain". Similarly, the package selecting part 90 selects the unit package of the sunlight condition specified as the current sunlight condition from the group of packages relating to the sunlight conditions, selects the unit package of the road type specified as the road type currently being run on from the group of packages relating to the road types, selects the unit package of the road condition specified as the current road condition from the group of packages relating to the road conditions, selects the unit package of the driver condition specified as the current driver condition from the group of packages relating to the driver conditions, and selects the unit package of the host vehicle condition specified as the current host vehicle condition from the group of package relating to the host vehicle conditions.

After selection of the unit packages, the package selecting part 90 determines the driving assistance package by combining the selected unit packages. At this time, in the present embodiment, the running assistance functions are combined by AND conditions and the vision assistance functions and congestion assistance functions are combined by OR conditions. Therefore, regarding driving assistance operations relating to the running assistance functions, driving assistance operations permitted in all unit packages are permitted in the driving assistance package. On the other hand, driving assistance operations which are not performed in one or more unit packages are not permitted in the driving assistance package.

Further, regarding driving assistance operations relating to the vision assistance functions and congestion assistance functions, driving assistance operations permitted in one or more unit packages are permitted in the driving assistance package. Further, driving assistance operations permitted in all unit packages are also permitted in the driving assistance package. On the other hand, driving assistance operations which are not permitted in all unit packages are not permitted in the driving assistance package.

In this way, in the present embodiment, the running assistance functions are combined by AND conditions while the vision assistance functions and congestion assistance functions are combined by OR conditions, but the methods of combinations are not limited. Combination by AND conditions or OR conditions in accordance with need is also possible. Further, all functions may be combined by AND conditions or OR conditions.

Next, at step S203, the package selecting part 90 judges whether the rejection count Cn of the driving assistance package determined at step S202 is less than a threshold value Cth. The rejection count Cn is detected by the rejection count detecting part 93 in the control routine of the rejection count detection processing explained later. "n" of the rejection count Cn is the package number corresponding to the driving assistance package determined at step S202. Further, the threshold value Cth is a predetermined integer of 1 or more.

If at step S203 it is judged that the rejection count Cn is less than the threshold value Cth, the control routine proceeds to step S204. At step S204, the package selecting part 90 selects the driving assistance package determined at step S202. After step S204, the control routine is ended.

On the other hand, if at step S203 it is judged that the rejection count Cn is the threshold value Cth or more, the control routine proceeds to step S205. In this case, it is considered that the driving assistance package determined at step S202 does not match the preferences of the driver. For this reason, at step S205, the package selecting part 90 selects a driving assistance package different from the driving assistance package determined at step S202.

For example, if the unit package of "wind" was included in the driving assistance package determined at step S202, the package selecting part 90 newly selects a driving assistance package including the unit package of "strong wind" instead of "wind". At this time, the priority degree of the unit package switched with the unit package currently included may be predetermined.

FIG. 13 is a map showing the priority degree of switching of unit packages in the group of packages relating to weather conditions. In this map, the smaller the numerical value in the column in which a unit package is described, the higher the priority degree for switching with the unit package of the column at the leftmost side. For example, for the unit package of "clear", the unit package with the highest priority degree of switching is the unit package of "wind", while the unit package with the lowest priority degree of switching is the unit package of "heavy snow". In this map, the higher the relevance with each unit package, the higher the priority degree of switching. Further, similar maps are prepared in advance for other groups of packages such as the sunlight conditions.

Further, the priority degree of a group of packages in which a unit package has been switched may be determined in advance. FIG. 14 is a map showing the priority degree of a group of packages in which a unit package has been switched. In this map, the smaller the numerical value in the column in which a group of packages is described, the higher the priority degree by which the unit packages are switched. In this case, the package selecting part 90 preferentially switches a unit package of a group of packages with a high priority degree when selecting a new driving assistance package.

The maps of FIG. 13 and FIG. 14 are stored in the ROM of the electronic control unit 80. Note that the maps of FIG. 13 and FIG. 14 are just illustrations. The priority degrees in the maps may be different from those shown. Further, the priority degrees shown in the maps may be periodically updated by wireless communication with the outside of the vehicle 1. In this case, the maps are stored in the RAM of the electronic control unit 80.

After step S205, the control routine is ended. Note that, at step S202, the package selecting part 90 may determine the driving assistance package based on at least one of the surrounding environment information, home vehicle information, and driver information.

<Rejection Count Detection Processing>

Figure 15:
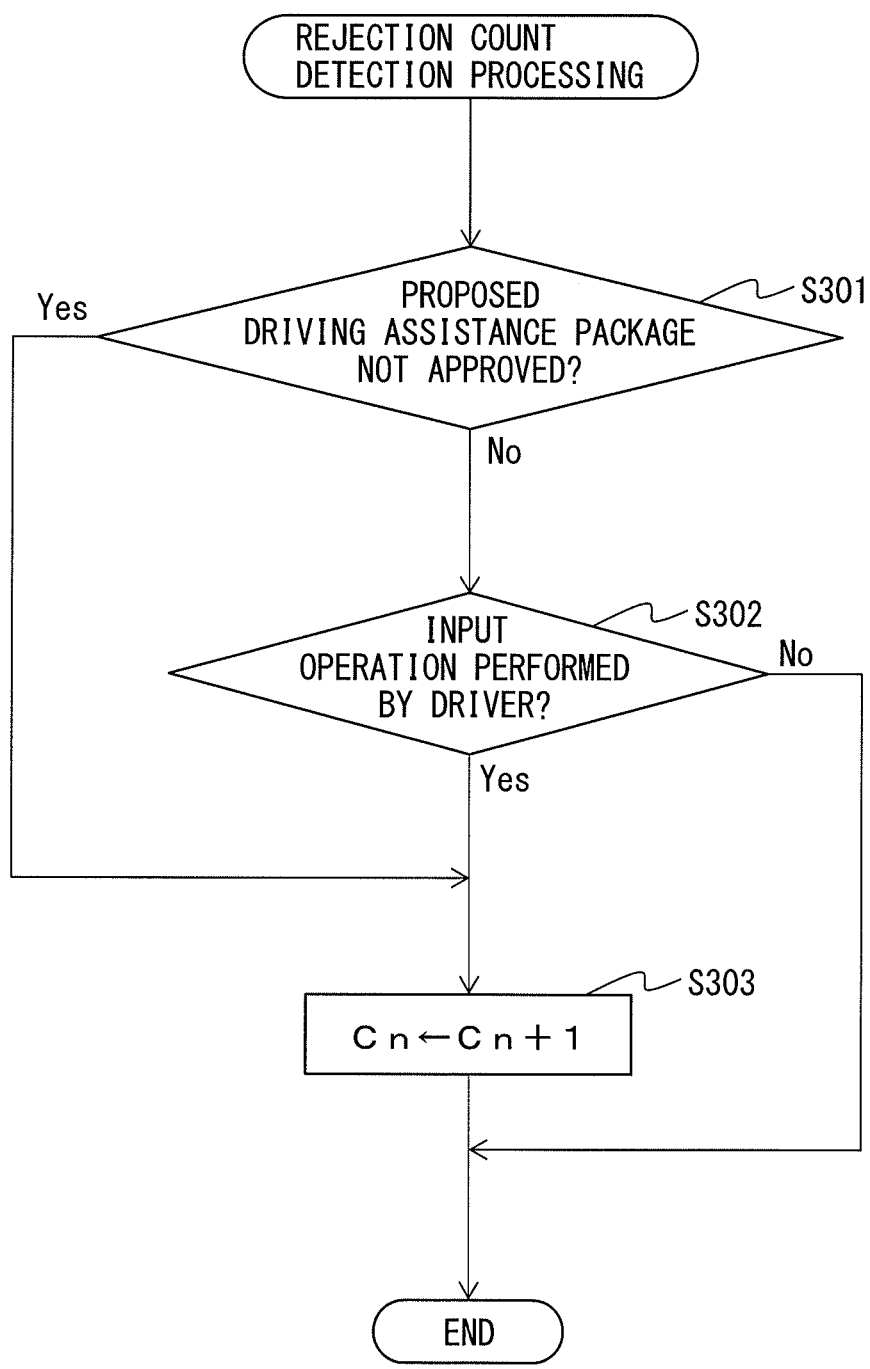
FIG. 15 is a flow chart showing a control routine of rejection count detection processing in the first embodiment of the present invention.

Below, referring to the flow chart of FIG. 15, rejection count detection processing will be explained. FIG. 15 is a flow chart showing the control routine of rejection count detection processing in the first embodiment of the present invention. The control routine is repeatedly performed by the electronic control unit 80 at predetermined time intervals while the driver selects the automated driving mode.

First, at step S301, the rejection count detecting part 93 judges whether the driving assistance package proposed by the package proposing part 91 had not been approved by the driver in the period from when step S301 had been performed the previous time to when step S301 is performed the current time. IF it is judged that the driving assistance package proposed by the package proposing part 91 was not approved by the driver, the control routine proceeds to step S303.

At step S303, 1 is added to the rejection count Cn of the not approved driving assistance package. The initial value of the rejection count Cn when the vehicle 1 is not yet used is zero. The rejection count Cn is stored in the RAM of the electronic control unit 80. "n" of the rejection count Cn is the number corresponding to the not approved driving assistance package. After step S303, the control routine is ended.

On the other hand, if at step S301 the driving assistance package proposed by the package proposing part 91 is approved by the driver or the driver did not perform an approval operation in the period from when step S301 was executed the previous time to when step S301 is executed the current time, the control routine proceeds to step S302.

At step S302, the rejection count detecting part 93 judges whether an input operation by the driver was performed in the period from execution of step S301 the previous time to execution of step S301 the current time. If it is judged that an input operation by the driver was performed, the control routine proceeds to step S303.

At step S303, the rejection count detecting part 93 adds 1 to the rejection count Cn of the driving assistance package which had been used when the driver performed the input operation. The "n" of the rejection count Cn is a number corresponding to the driving assistance package which had been used when the input operation by the driver was performed. After step S303, the control routine is ended.

On the other hand, if at step S302 it was judged that an input operation by the driver had not been performed, the control routine is ended.

Note that, the order of step S301 and step S302 may be reversed. Further, either of step S301 and step S302 may be omitted.

Second Embodiment

The configuration and control of the automated driving system according to the second embodiment are basically similar to the configuration and control of the automated driving system according to the first embodiment except for the points explained below. For this reason, below, the second embodiment of the present invention will be explained focusing on the parts different from the first embodiment.

In the second embodiment, the package selecting part 90 selects a driving assistance package in which performance of driving assistance operations for which performance had been obstructed by an input operation performed by the driver is not permitted, if the rejection count of the driving assistance package determined based on at least one of the surrounding environment information, vehicle information, and driver information is a threshold value or more. Due to this, it is possible to propose to the driver a driving assistance package better reflecting the preferences of the driver.

<Priority Degree Changing Processing>

Figure 16:
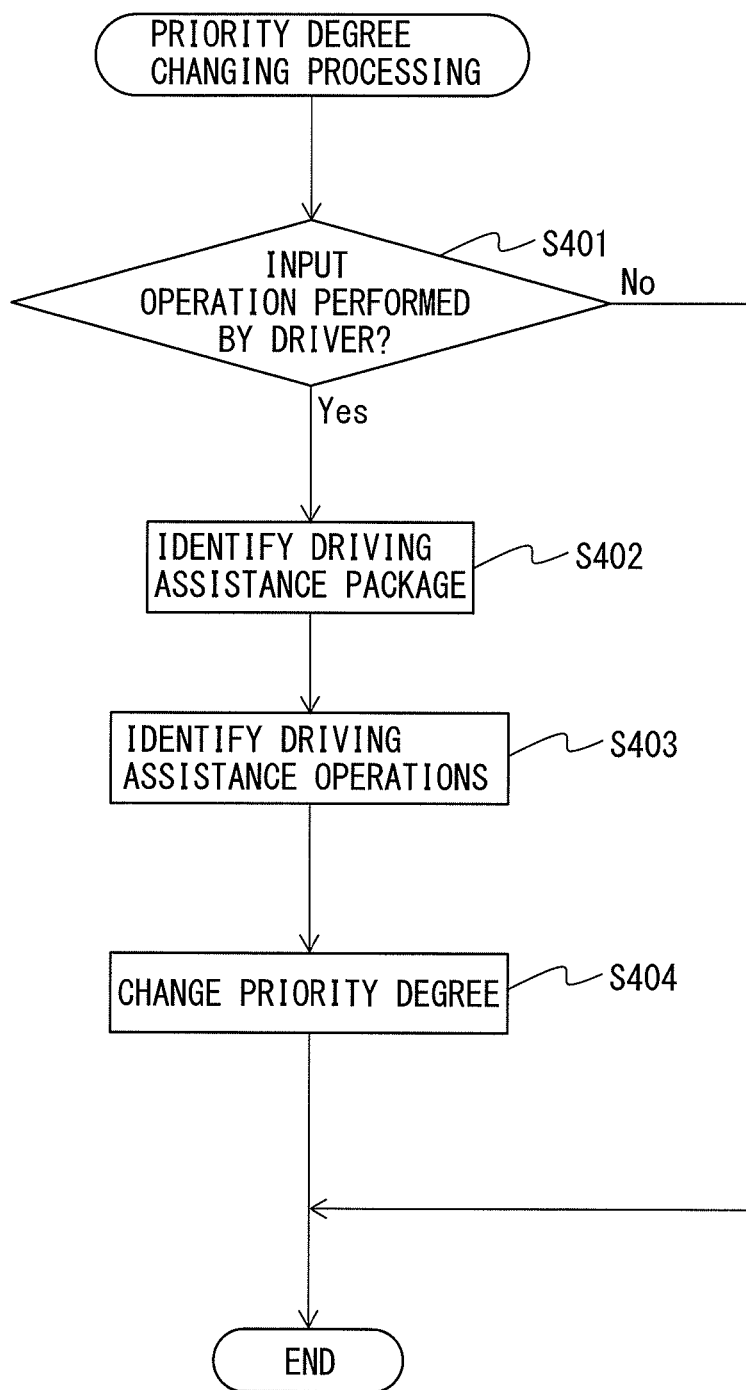
FIG. 16 is a flow chart of a control routine of priority degree changing processing in a second embodiment of the present invention.

In the second embodiment, in addition to the control routines shown in FIG. 11, FIG. 12, and FIG. 15, the control routine shown in FIG. 16 is performed. FIG. 16 is a flow chart showing the control routine of priority degree changing processing in the second embodiment of the present invention. This control routine is repeatedly performed by the electronic control unit 80 at predetermined time intervals while the automated driving mode is selected by the driver.

First, at step S401, the package selecting part 90 judges whether an input operation by the driver was performed in the period from when step S401 was executed the previous time to when step S401 is executed the current time. If it was judged that an input operation by the driver was not performed, the control routine is ended. On the other hand, if it was judged that an input operation by the driver was performed, the control routine proceeds to step S402.

At step S402, the package selecting part 90 identifies the driving assistance package which had been used when the input operation by the driver was performed. Next, at step S403, the package selecting part 90 identifies the driving assistance operations which had been performed when the input operation by the driver was performed.

Next, at step S404, the package selecting part 90 changes the priority degree of the driving assistance package newly selected when the rejection count of the driving assistance package identified at step S402 is a threshold value or more. At this time, the package selecting part 90 raises the priority degree of the driving assistance package in which performance of the driving assistance operations identified at step S403 was not permitted.

As shown in FIG. 5, in the unit package of "snow", performance of lane tracking control is permitted, while in the unit packages of "heavy rain", "heavy snow", and "dense fog", performance of lane tracking control is not permitted. Further, as shown in FIG. 13, in the column of unit packages of "snow", among the unit packages of "heavy rain", "heavy snow", and "dense fog", "heavy snow" is the highest in priority degree. For this reason, for example, when lane tracking control for which performance is permitted in the driving assistance package in which the unit package of "snow" had been combined is being performed, if an input operation by the driver was performed, the package selecting part 90 switches "rain" and "heavy snow" in the column of the unit package of "snow" in the map of FIG. 13. Note that, in this case, the map of FIG. 13 is stored in the RAM of the electronic control unit 80.

After step S404, the control routine is ended.

Third Embodiment

The configuration and control of the automated driving system according to the third embodiment are basically similar to the configuration and control of the automated driving system according to the first embodiment except for the points explained below. For this reason, below, the third embodiment of the present invention will be explained focusing on the parts different from the first embodiment.

Figure 17:
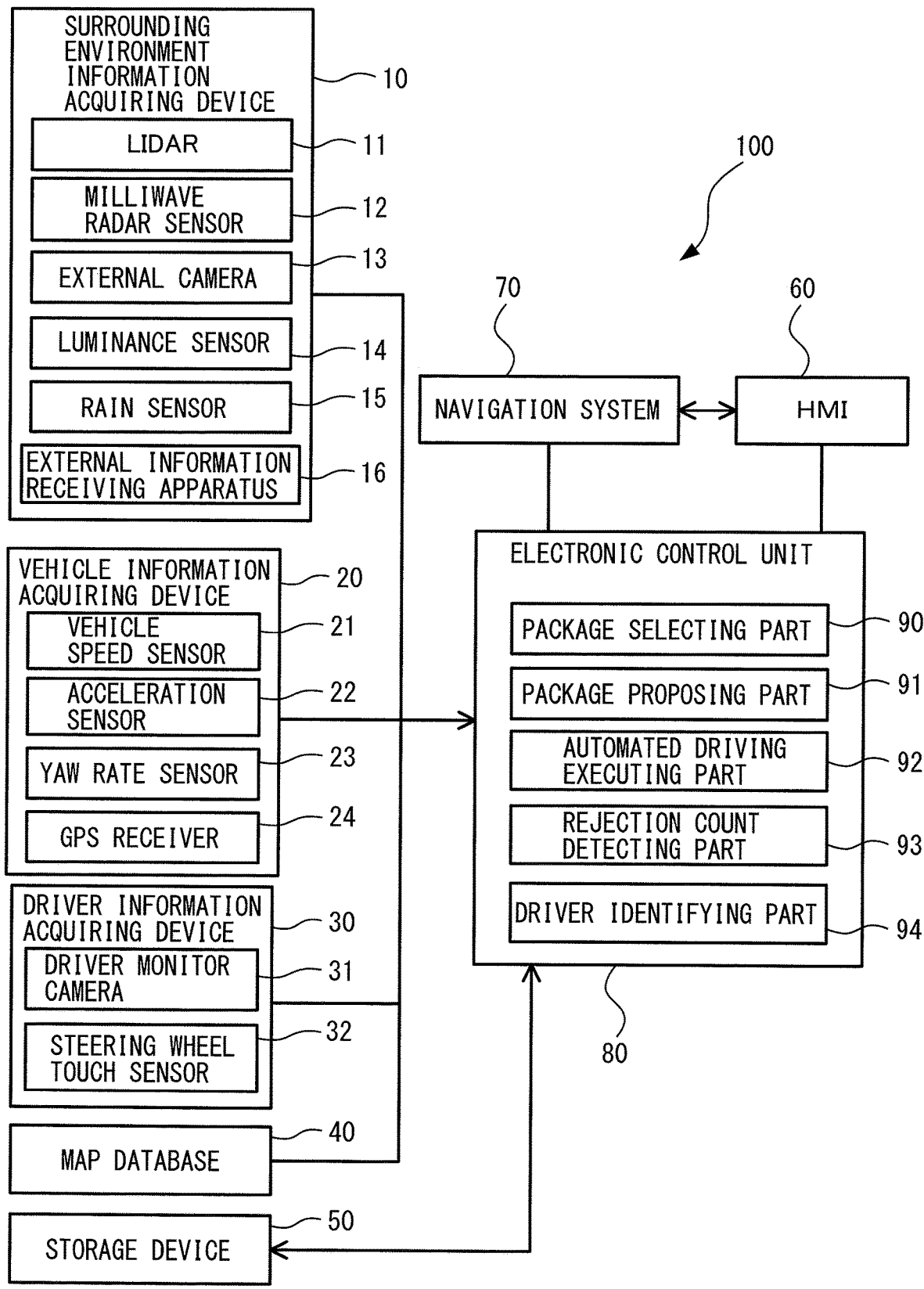
FIG. 17 is a block diagram showing the configuration of an automated driving system of a vehicle according to a third embodiment of the present invention.

FIG. 17 is a block diagram showing the configuration of an automated driving system 100' of a vehicle according to the third embodiment of the present invention. The automated driving system 100' is further provided with a driver identifying part 94 identifying the driver of the vehicle 1 based on driver information. The driver information is acquired by the driver information acquiring device 30.

In the third embodiment, the rejection count detecting part 93 judges whether performance of the driving assistance operations for which performance is permitted in the driving assistance package has been rejected by the driver identified by the driver identifying part 94, and detects the number of times performance of the driving assistance operations for which performance is permitted in the driving assistance package was rejected by the driver identified by the driver identifying part 94 as the rejection count of the driving assistance package. Further, the package selecting part 90 selects a driving assistance package different from that driving assistance package, if the rejection count of the driving assistance package detected by the rejection count detecting part 93 is the threshold value or more. For this reason, in the third embodiment, even if the vehicle 1 is used by a plurality of drivers, driving assistance packages matching the preferences of the different drivers can be proposed.

<Rejection Count Detection Processing>

Figure 18:
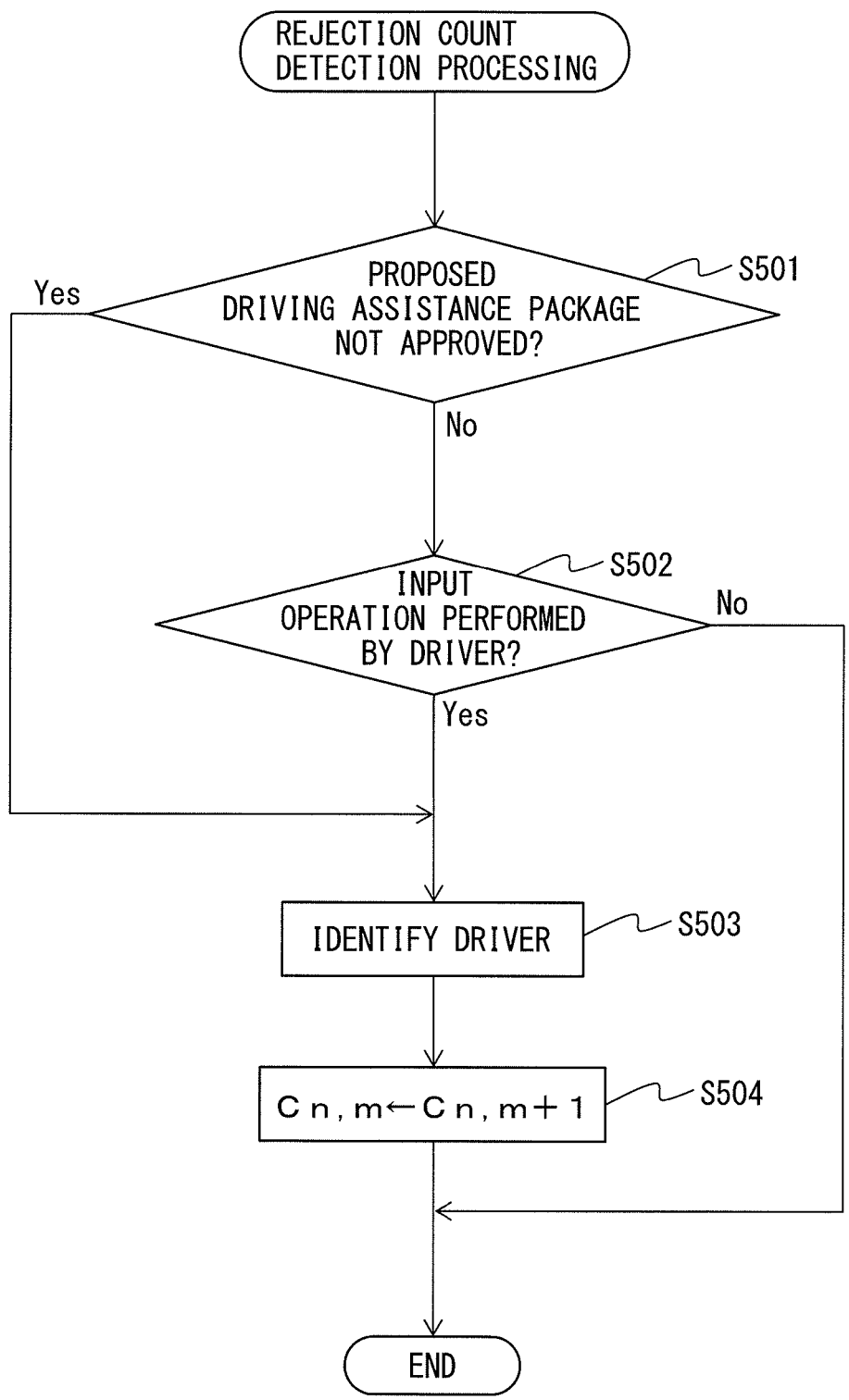
FIG. 18 is a flow chart of a control routine of rejection count detection processing in the third embodiment of the present invention.

In the third embodiment, instead of the control routine shown in FIG. 15, the control routine shown in FIG. 18 is executed. FIG. 18 is a flow chart showing a control routine of the rejection count detection processing in the third embodiment of the present invention. The control routine is repeatedly performed by the electronic control unit 80 at predetermined time intervals while the driver selects the automated driving mode. In FIG. 18, step S501 and step S502 are similar to step S301 and step S302 in FIG. 15, so explanations will be omitted.

If at step S501 it is judged that the driving assistance package proposed by the package proposing part 91 was not approved by the driver, or if at step S502 it was judged that an input operation by the driver was performed, the control routine proceeds to step S503.

At step S503, the driver identifying part 94 identifies the driver of the vehicle 1 based on the driver information. The driver information is acquired by the driver information acquiring device 30. The driver identifying part 94, for example, compares the facial expression of the driver detected by the driver monitor camera 31 with the facial expressions of drivers stored in advance in the ROM to thereby identify the driver of the vehicle 1.

Next, at step S504, the rejection count detecting part 93 adds 1 to the rejection count $C_{n,m}$ of the driving assistance package. The "n" of the rejection count $C_{n,m}$ is a number corresponding to the driving assistance package which was not approved or the driving assistance package which was used when the input operation by the driver was performed. Further, the "m" of the rejection count $C_{n,m}$ is a number corresponding to the driver identified at step S503. After step S504, the control routine is ended.

<Driving Assistance Package Selection Processing>

Figure 19:
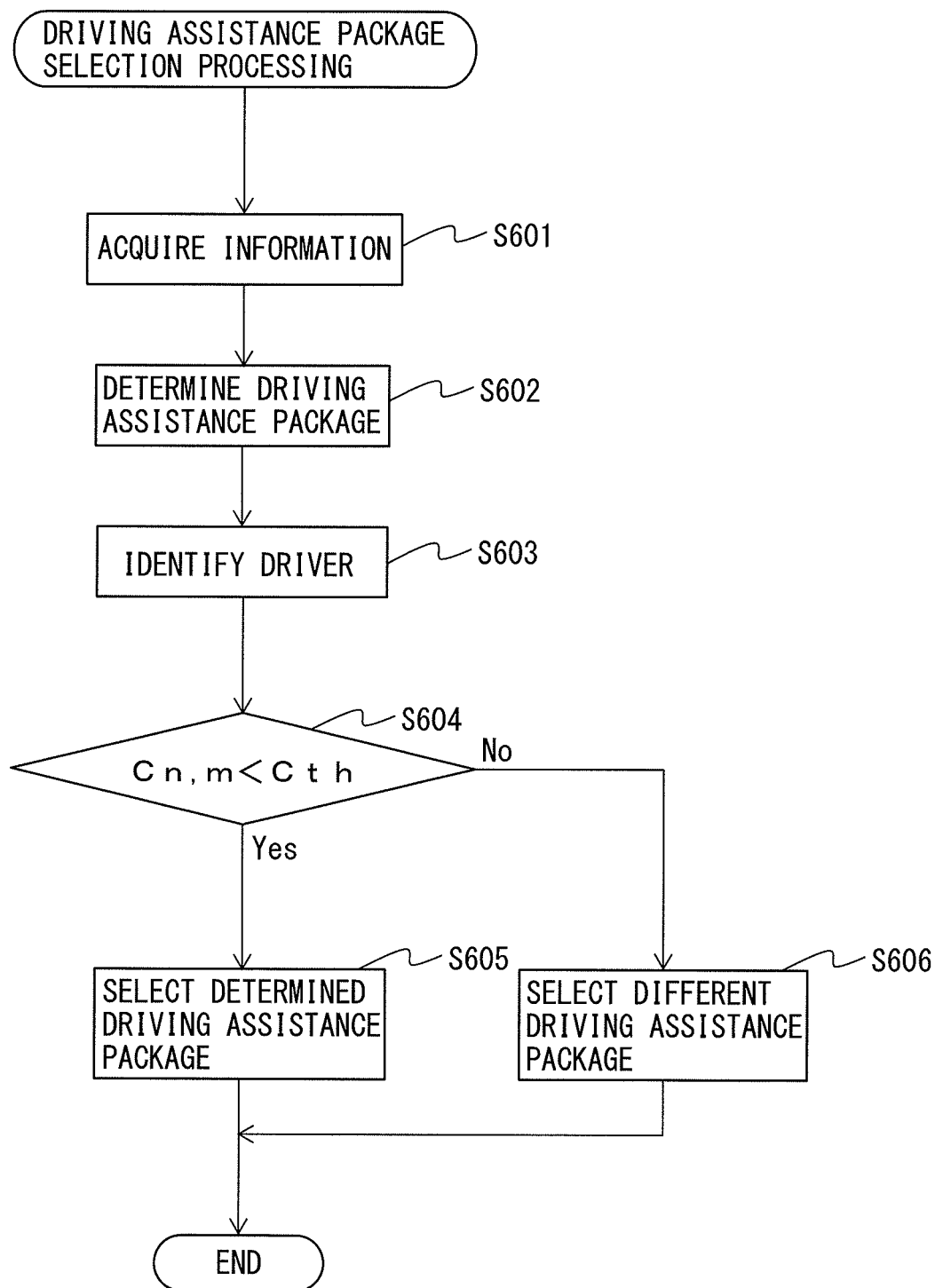
FIG. 19 is a flow chart of a control routine of driving assistance package selection processing in the third embodiment of the present invention.

Further, in the third embodiment, at step S102 of FIG. 11, instead of the control routine shown in FIG. 12, the control routine shown in FIG. 19 is executed. FIG. 19 is a flow chart showing the control routine of driving assistance package selection processing in the third embodiment of the present invention. In FIG. 19, step S601, step S602, step S605, and step S606 are similar to step S201, step S202, step S204, and step S205 in FIG. 12, so explanations will be omitted.

After step S602, the control routine proceeds to step S603. At step S603, in the same way as step S503 of FIG. 18, the driver identifying part 94 identifies the driver of the vehicle 1 based on the driver information. Next, at step S604, the package selecting part 90 judges whether the rejection count $C_{n,m}$ of the driving assistance package determined at step S602 is less than the threshold value Cth. The rejection count $C_{n,m}$ is detected by the rejection count detecting part 93 in the control routine of the rejection count detection processing of FIG. 18. The "n" of the rejection count $C_{n,m}$ is a number corresponding to the driving assistance package which was determined at step S602. Further, the "m" of the rejection count $C_{n,m}$ is a number corresponding to the driver identified at step S603.

If at step S604 it was judged that the rejection count $C_{n,m}$ is less than the threshold value Cth, the control routine proceeds to step S605. On the other hand, when at step S604 it was judged that the rejection count $C_{n,m}$ is the threshold value Cth or more, the control routine proceeds to step S606.

Above, preferred embodiments according to the present invention were explained, but the present invention is not limited to these embodiments and can be corrected and changed in various ways within the scope of the claims. For example, in the above-mentioned embodiments, the driving assistance package is determined by combining unit packages selected based on the surrounding environment information etc., but the driving assistance package may be determined from combinations of unit packages determined in advance based on the surrounding environment information etc. In this case, for each driving assistance package, the priority degree of the newly selected driving assistance package is stored in the ROM or RAM of the electronic control unit 80.

Further, the above-mentioned embodiments can be carried out in any combinations. For example, the control routine shown in FIG. 16 may be performed in the third embodiment.

REFERENCE SIGNS LIST 1. vehicle
10. surrounding environment information acquiring device
20. vehicle information acquiring device
30. driver information acquiring device
80. electronic control unit
90. package selecting part
91. package proposing part
92. automated driving executing part
93. rejection count detecting part
94. driver identifying part
100, 100'. automated driving system

The invention claimed is:

1. A vehicle automated driving system comprising
a surrounding environment information acquiring device configured to acquire surrounding environment information relating to surrounding environment conditions of the vehicle,
a vehicle information acquiring device configured to acquire vehicle information relating to conditions of the vehicle,
a driver information acquiring device configured to acquire driver information relating to conditions of a driver of the vehicle,
a package selecting part configured to select a driving assistance package, wherein the driving assistance package packages permissions for each of a plurality of driving assistance operations and permits at least one of the plurality of driving assistance operations to be performed,
a package proposing part configured to propose the driving assistance package selected by the package selecting part to the driver,
an automated driving executing part configured to execute driving assistance operations for which performance is permitted in the driving assistance package proposed by the packaging proposing part and approved by the driver, and
a rejection count detecting part configured to judge whether the driver has rejected performance of individual driving assistance operations for which performance is permitted in a driving assistance package and detect the number of times the driver has rejected performance of the individual driving assistance operations for which performance is permitted in the driving assistance package as the rejection count of the driving assistance package, wherein
the package selecting part is configured to determine one driving assistance package from a plurality of driving assistance packages based on at least one of the surrounding environment information, the vehicle information, and the driver information, select the determined driving assistance package if the rejection count of the determined driving assistance package is less than a predetermined threshold value, and select a different driving assistance package that is different from the determined driving assistance package if the rejection count of the determined driving assistance package is the threshold value or more.

2. The vehicle automated driving system according to claim 1, wherein the rejection count detecting part is configured to judge that performance of the individual driving assistance operations for which performance is permitted in the driving assistance package has been rejected by the driver, if the driving assistance package proposed by the package proposing part was not approved by the driver.

3. The vehicle automated driving system according to claim 1, wherein the rejection count detecting part is configured to judge that performance of the individual driving assistance operations for which performance is permitted in the driving assistance package has been rejected by the driver, if performance of driving assistance operations for which performance is permitted in the driving assistance package was obstructed by an input operation performed by the driver.

4. The vehicle automated driving system according to claim 2, wherein the rejection count detecting part is configured to judge that performance of the individual driving assistance operations for which performance is permitted in the driving assistance package has been rejected by the driver, if performance of driving assistance operations for which performance is permitted in the driving assistance package was obstructed by an input operation performed by the driver.

5. The vehicle automated driving system according to claim 3, wherein the input operation performed by the driver is at least one of acceleration, steering, and braking.

6. The vehicle automated driving system according to claim 4, wherein the input operation performed by the driver is at least one of acceleration, steering, and braking.

7. The vehicle automated driving system according to claim 3, wherein the package selecting part is configured to select the different driving assistance package based on which performance of driving assistance operations was obstructed by the input operation performed by the driver.

8. The vehicle automated driving system according to claim 4, wherein the package selecting part is configured to select the different driving assistance package based on which performance of driving assistance operations was obstructed by the input operation performed by the driver.

9. The vehicle automated driving system according to claim 5, wherein the package selecting part is configured to select the different driving assistance package based on which performance of driving assistance operations was obstructed by the input operation performed by the driver.

10. The vehicle automated driving system according to claim 6, wherein the package selecting part is configured to select the different driving assistance package based on which performance of driving assistance operations was obstructed by the input operation performed by the driver.

11. The vehicle automated driving system according to claim 1, wherein
the system further comprises a driver identifying part configured to identify the driver of the vehicle based on the driver information, and
the rejection count detecting part is configured to judge whether performance of the individual driving assistance operations for which performance is permitted in a driving assistance package has been rejected by the driver identified by the driver identifying part, and detect the number of times performance of the individual driving assistance operations for which performance is permitted in the driving assistance package has been rejected by the driver identified by the driver identifying part as the rejection count of the driving assistance package.

12. A vehicle automated driving system for a vehicle, comprising:
at least one first sensor that acquires surrounding environment information relating to surrounding environment conditions of the vehicle;
at least one second sensor that acquires vehicle information relating to conditions of the vehicle;
at least one third sensor that acquires driver information relating to conditions of a driver of the vehicle; and
an electronic control unit (ECU) including at least one processor programmed to:
select a driving assistance package, wherein the driving assistance package packages permissions for each of a plurality of driving assistance operations to be performed during an automated driving mode and permits at least one of the plurality of driving assistance operations to be performed during the automated driving mode,
propose the driving assistance package that was selected to the driver, execute the automated driving mode which includes driving assistance operations that are permitted in the proposed driving assistance package that has been approved by the driver, and judge whether the driver has rejected performance of individual driving assistance operations that are permitted in a driving assistance package and detect the number of times the driver has rejected performance of the individual driving assistance operations that are permitted in the driving assistance package as the rejection count of the driving assistance package, wherein the determination of the driving assistance package from among a plurality of driving assistance packages is based on at least one of the surrounding environment information, the vehicle information, and the driver information, the determined driving assistance package is selected if the rejection count of the determined driving assistance package is less than a predetermined threshold value, and a different driving assistance package that is different from the determined driving assistance package is selected if the rejection count of the determined driving assistance package is the threshold value or more.

* * * * *